US006800048B2

(12) United States Patent
Vesenjak

(10) Patent No.: US 6,800,048 B2
(45) Date of Patent: Oct. 5, 2004

(54) INFINITELY VARIABLE FRICTION GEAR

(75) Inventor: Andelko Vesenjak, Wangen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 149 days.

(21) Appl. No.: 10/297,086

(22) PCT Filed: Jul. 10, 2001

(86) PCT No.: PCT/EP01/07918
§ 371 (c)(1),
(2), (4) Date: Nov. 27, 2002

(87) PCT Pub. No.: WO02/06703
PCT Pub. Date: Jan. 24, 2002

(65) Prior Publication Data
US 2003/0139251 A1 Jul. 24, 2003

(30) Foreign Application Priority Data
Jul. 14, 2000 (DE) .......................... 100 34 373

(51) Int. Cl.[7] .............................................. F16H 15/38
(52) U.S. Cl. ................. 476/40; 476/42; 476/1
(58) Field of Search ................. 476/40, 42, 1

(56) References Cited

U.S. PATENT DOCUMENTS

| 3,581,587 | A | * | 6/1971 | Dickenbrock | 476/40 |
| 4,086,820 | A | | 5/1978 | Kraus et al. | 74/200 |
| 4,934,206 | A | | 6/1990 | Nakano | 74/200 |
| 4,974,466 | A | | 12/1990 | Kraus et al. | 74/200 |
| 5,213,011 | A | | 5/1993 | Nobumoto et al. | 74/862 |
| 5,803,857 | A | | 9/1998 | Yamamoto | 475/192 |
| 6,030,310 | A | * | 2/2000 | Greenwood et al. | 476/10 |
| 6,132,331 | A | | 10/2000 | Imanishi et al. | 476/10 |
| 6,402,657 | B1 | | 6/2002 | Sich | 476/42 |
| 2003/0139251 | A1 | * | 7/2003 | Vesenjak | 476/40 |
| 2003/0148849 | A1 | * | 8/2003 | Sich et al. | 476/40 |
| 2003/0158013 | A1 | * | 8/2003 | Sich et al. | 476/41 |

FOREIGN PATENT DOCUMENTS

| DE | 197 05 521 A1 | 8/1997 | F16H/63/06 |
| DE | 197 54 725 A1 | 6/1999 | F16H/15/38 |
| DE | 198 26 057 A1 | 12/1999 | F16H/15/38 |
| JP | 08035551 | 2/1996 | F16H/15/38 |
| JP | 11063133 | 3/1999 | F16H/15/38 |
| JP | 11-230291 | 8/1999 | F16H/15/38 |
| JP | 2000027963 | 1/2000 | F16H/15/38 |

* cited by examiner

Primary Examiner—David Fenstermacher
(74) Attorney, Agent, or Firm—Davis & Bujold, P.L.L.C.

(57) ABSTRACT

The infinitely variable friction wheel transmission with two transmission units and a traction element wound around the carriers of each respective transmission unit in the form of a Figure-8, comprises for each carrier a compensating element which exerts a restoring force on the carriers when a differential angle occurs between the two carriers.

8 Claims, 2 Drawing Sheets

INFINITELY VARIABLE FRICTION GEAR

FIELD OF THE INVENTION

The present invention concerns an infinitely variable friction wheel transmission.

BACKGROUND OF THE INVENTION

An infinitely variable friction wheel transmission of this type usually has input and output discs arranged coaxially on a common shaft, arranged together in pairs and whose inside surfaces are designed in toroidal shape, with friction wheels arranged between the pairs of input and output discs. These friction wheels are in frictional contact with both the input discs and the output discs, and transfer the torque to be transmitted from the input disc to the output disc by virtue of friction-force contact, whre the rotation speed of the friction wheels being the higher the larger is the distance between their point of contact with the input disc and the rotation axis. In contrast, the rotation speed of the output discs is higher the closer the point of contact between the friction wheel and the output disc is to the rotation axis. Accordingly, by swivelling the friction wheels, the rotation speed of the output discs can be infinitely variably adjusted as desired. For this purpose, the rotation axles of the friction wheels are in each case mounted on a carrier which can be controlled by means of a swivelling device.

Such an infinitely variable friction wheel transmission is described in detail in DE 197 54 725 by the present applicant. This transmission comprises two transmission units arranged coaxially with the input shaft, each transmission unit having an input disc and an output disc between which, in each case, are arranged two friction wheels, each friction wheel being attached on a carrier that can be swivelled. Both the input and the output discs are mounted on a torque shaft which can be displaced slightly in the axial direction relative to the input shaft. The input disc of one transmission unit is rotationally fixed with respect to the torque shaft, but is mounted on the latter so that it can slide axially on it. The input disc of the other transmission unit too is connected to the torque shaft in a rotationally fixed way by virtue of drive gearing. The two output discs of the two transmission units are arranged mirror-symmetrically and adjacent to one another in the transmission, and are arranged on a common bushing, so that a torque transmitted from one input disc to its associated output disc and a torque transmitted from the other input disc to its associated output disc, are transmitted from the two output discs in rotationally fixed connection with the bushing to a gear-wheel that meshes with a gearwheel of an output shaft. A roller-shaped pressing mechanism acts upon one of the input discs, which is mounted so as to be displaceable in the axial direction on the input shaft but is in a rotationally fixed connection with it.

In the known infinitely variable friction wheel transmissions, the transmission ratio is usually adjusted by moving the friction wheels tangentially with respect to the transmission axle, such that, however, swivel forces from the input and output discs act on the friction wheel arranged between them, since to transfer the torque these discs have to be pressed against the friction wheel. In conventional infinitely variable friction wheel transmissions the friction wheel in each transmission unit is arranged such that its swivel axis is positioned at the mid-point of the torus formed by the associated input and output discs. Thus, at the contact point of the friction wheel with its associated input and output discs, so-termed normal forces are produced when the transmission ratio is adjusted.

To avoid the possibility that the normal forces occurring during transmission ratio adjustment are unequal, the torque moment on the friction wheel resulting from this might produce an undesired change of the transmission ratio of the transmission, it has already been proposed in DE 198 26 057 by the present applicant to compensate for a possible difference in the normal forces by producing a control force, such that with the friction wheel held axially, this control force which leads to tilting of the friction wheel, can be applied to one of the two associated discs, while when one of the discs is axially fixed, the control force acts on the friction wheel.

It has also already been proposed to support the friction wheels in an infinitely variable friction wheel transmission by means of two connecting rods which oppose the occurring reaction forces. In this, the swivelling movement of the friction wheels is made possible by roller bearings; this design, however, has the disadvantage that the weight of the friction wheel transmission is higher and there is no coupling of the swivelling movements of two carriers arranged in a transmission unit for the friction wheels.

Further, an infinitely variable friction wheel transmission has been proposed, in which at the top and bottom ends of the carriers in any one transmission unit a traction element is provided, for example an endless cable, which passes around the corresponding ends of the carriers essentially in a circle and which, to produce synchronous swivelling movements of the carriers in opposite directions, is arranged in the form of a Figure-8, with a crossover point mid-way between the two carriers. This arrangement both takes up the reaction forces on the friction wheels and also synchronizes the swivel angle of the two associated carriers in each transmission unit.

Now, if the traction element is used in such manner that no differential angle is possible between the carriers, i.e., the play between the traction element and the carrier is very small, manufacturing tolerances can lead to forced slippage under the friction wheels. If the traction element is used such that there is large play between the traction element and the carrier, then the necessary coupling between the carriers will only exist when there is already a large differential angle between the two carriers.

The purpose of the present invention is to provide a coupling between the two carriers of any one transmission unit, which enables a certain, specified differential angle between the two carriers to be set but, at the same time, when a differential angle occurs, a restoring force on the corresponding carrier is produced.

SUMMARY OF THE INVENTION

According to the invention, then, it is provided that a compensating element is associated with each carrier in a transmission unit, which brings about effective coupling of the two carriers of the transmission unit such that when a differential angle occurs between the two carriers, a restoring force is exerted on the carrier. The compensating elements are advantageously inserted as connection elements in the traction element.

In an example of a preferred embodiment, the compensating element comprises a support disc in contact with a spring surrounded by a sleeve, which is fitted so that it can move within a bushing against the force of another spring, while the other section of the traction element is attached to the center of the support disc.

The provision of a compensating element for each traction element provides the advantage that when a differential angle occurs, a restoring force is exerted on both carriers, whose effect is to reduce the differential angle. At the same time, tolerances in the mounting for the traction element and in the traction element itself can be compensated by the gradual rise of the restoring force, without leading to forced slippage at the contact points.

The manufacturing tolerances of the components, i.e., the holder for the traction element and the traction element itself, can be correspondingly greater. The behavior of the infinitely variable friction wheel transmission can be affected by choosing different characteristics for the springs used.

At the same time, the stability of the friction wheel transmission is increased by this type of coupling; dampers provided in the compensating element can damp any additional oscillations that occur.

BRIEF DESCRIPTION OF THE DRAWINGS

Below, the invention is explained in more detail with reference to the drawing in which two advantageous example embodiments are illustrated. The figures show.

DETAILED DESCRIPTION OF THE INVENTION

Infinitely variable friction wheel variators are well known to those familiar with the subject, so that in what follows, only those components necessary for understanding the invention are described and illustrated. The same components are denoted by the same reference numbers in the various figures.

Figure 1:
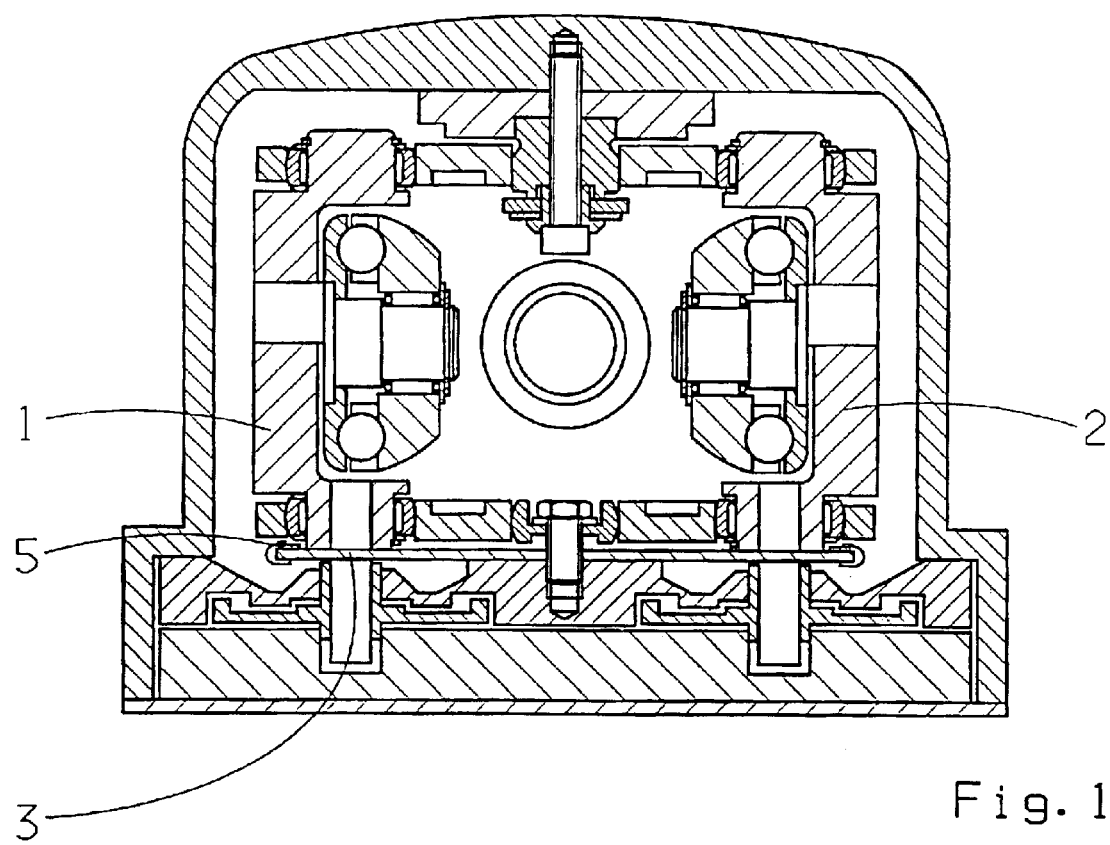
FIG. 1 is a radial cross-section through a transmission unit of an infinitely variable friction wheel transmission.
Figure 2:
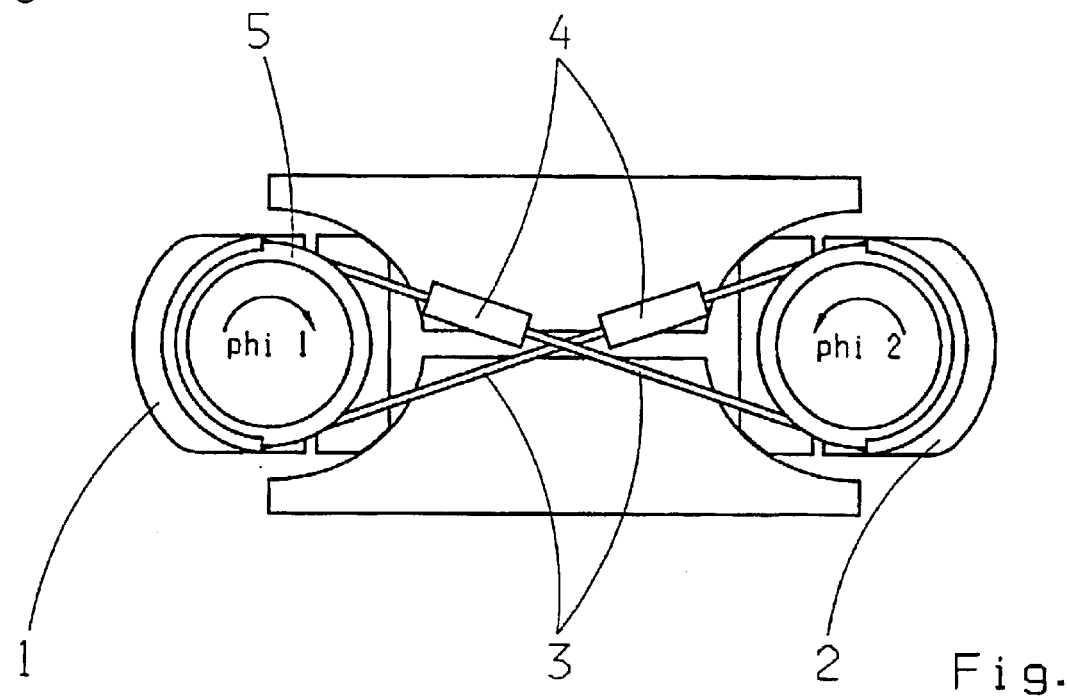
FIG. 2 is a schematic plan view of a traction element with inserted compensating element.

The two swivelling carriers for the friction wheels in a transmission unit are referenced as 1 and 2. A traction element indexed 3 which, as viewed in FIG. 1, is provided at the bottom ends of the two carriers 1, 2 for the friction wheels, wraps around the carriers 1, 2 essentially in a circle, so that the two carriers 1, 2 are coupled in relation to their swivel angle. For this, the traction element 3 is guided by holders 5 on the carriers 1, 2.

According to the invention, a so-termed phi-coupling is now provided between the two carriers 1, 2, in that two compensating elements 4 are inserted in the traction element 3, such that a specified differential angle between the two carriers 1, 2 can occur but, at the same time, a restoring force is exerted on the carriers.

Figure 3:
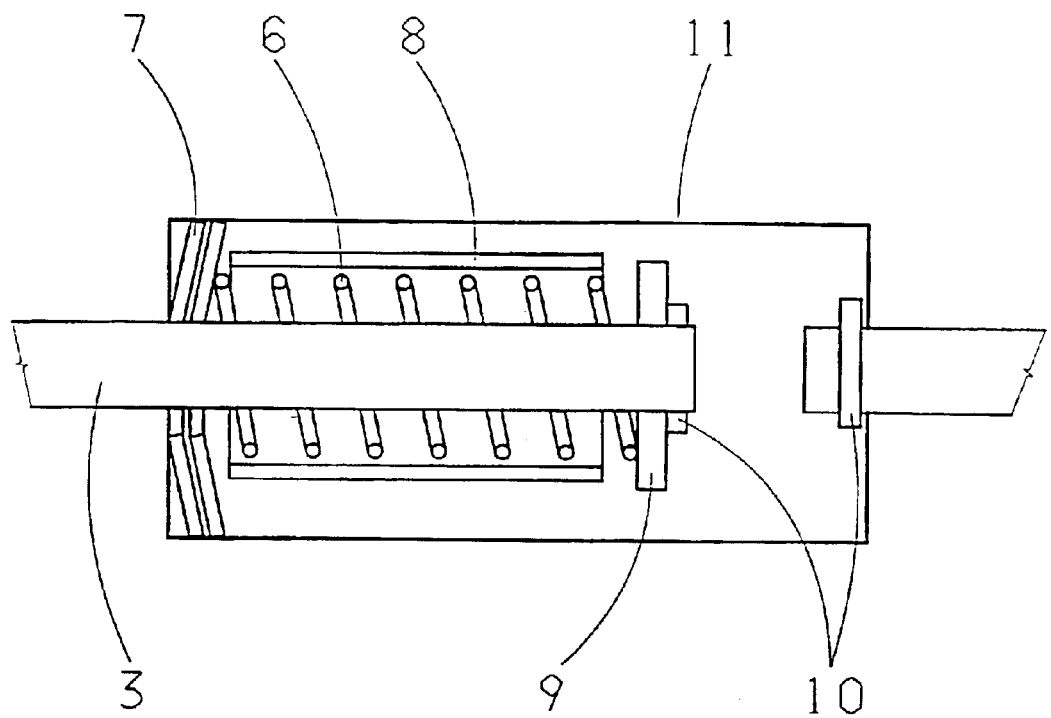
FIG. 3 is an enlarged representation of a compensating element.

FIG. 3 shows a section through one of the compensating elements. When a differential angle (phi1–phi2) occurs, a support disc 9 is pressed against a spring 6 so as to produce a restoring force in the traction element 3 on one of the two carriers 1, 2. By means of a series or parallel arrangement of various spring elements 6, 7 the restoring force can be adjusted as a function of the differential angle and other parameters.

The maximum permissible differential angle can be limited by a sleeve. Advantageously, the restoring force on the carriers is small for a small differential angle, so that manufacturing tolerances will not result in large restoring forces. In contrast, with larger differential angles it is advantageous for the restoring force to increase steeply so that if oscillations occur the effect of this phi-coupling is brought into play. Equally well, a damper can be integrated in the compensating element 4.

One end of the traction element 3 is connected to the support disc 9 by means of a locking disc 10, while the other end of the traction element 3 is connected to the bushing 11 by means of a locking disc 10.

Figure 4:
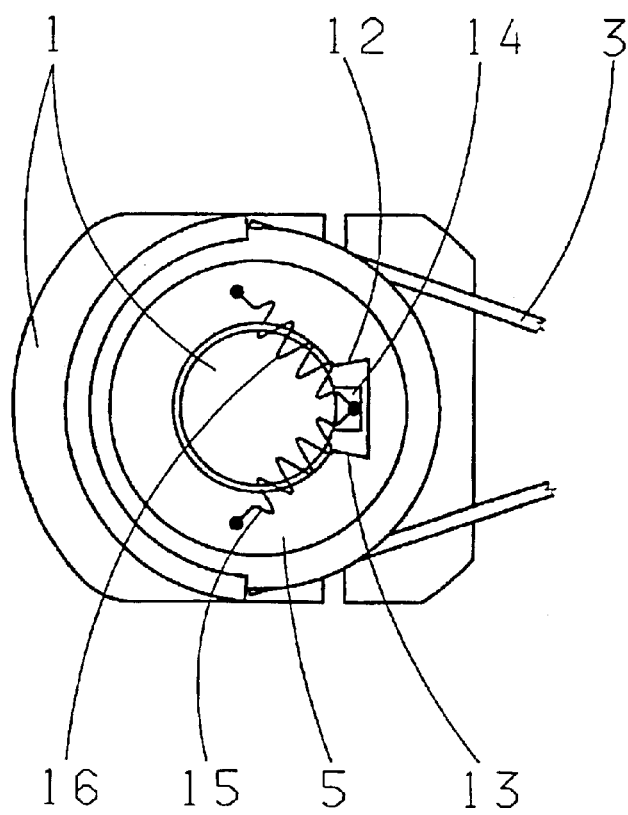
FIG. 4 is a partial representation of a traction element with another example embodiment of a compensating element

In the example embodiment of a compensating element shown in FIG. 4, the holder for the traction element 3 is again referenced as 5; the carrier 1 has a projection 14 which engages in a corresponding recess such that its rotation is limited by two abutments 12, 13. Two springs 15, 16 are in each case attached at one end to the holder 5 for the traction element 3 and are connected at the other end to the projection 14 of the carrier 1. Here too, the size of the restoring force on the carriers can be influenced by an appropriate choice of the characteristics of the springs.

| Reference numbers | |
|---|---|
| 1 | Carrier |
| 2 | Carrier |
| 3 | Traction element |
| 4 | Compensating element |
| 5 | Holder |
| 6 | Spring |
| 7 | Spring |
| 8 | Sleeve |
| 9 | Support disc |
| 10 | Locking disc |
| 11 | Bushing |
| 12 | Abutment |
| 13 | Abutment |
| 14 | Projection |
| 15 | Spring |
| 16 | Spring |

What is claimed is:

1. An infinitely variable friction gear having at least two transmission unite, each transmission unit comprising an input disc provided coaxially with the input shaft and having a toroidally shaped inside surface, and an output disc arranged coaxially with the input shaft and having a toroidally shaped inside surface, such that in each case an input disc and an output disc form a pair, several friction wheels, which are arranged and are able to swivel between the pairs of input discs and output discs, and each of which is mounted on a carrier, for the transfer of a torque from the input disc to its associated output disc by swivelling of the carriers and so too of the friction wheels and a traction element which winds around the ends of the carriers essentially in a circle and which, to produce a synchronous swivelling movement in opposite directions, is arranged in the form or a figure-8 with its crossover point mid-way between the two carriers, wherein with each carrier of a transmission unit there is associated a compensating unit (4) which effectively couples the two carriers (1, 2) of the transmission unit in such manner that when a differential angle occurs between the two carriers, a restoring force is exerted upon the carriers.

2. The infinitely variable friction gear according to claim 1, wherein the first and second compensating elements (4) are connection components inserted in the contiguous loop of the traction element (3).

3. The infinitely variable friction gear according to claim 1, wherein each compensating element (4) comprises a support disc (9) which contacts a spring (6) surrounded by a sleeve (8) and fitted in a bushing (11) so that the support disc (9) can be displaced relative to the bushing (11) against the force of another spring (7), and one section of the traction element (3) is centrally attached to the displaceable support disc (9) while the other end of the traction element (3) is attached to an end portion of the bushing (11).

4. The infinitely variable friction gear according to claim 1, wherein the first and second compensating elements (4) are provided as a component of each of the respective first and second carriers (1, 2).

5. The infinitely variable friction gear according to claim 1, wherein each compensating element (4) comprises two springs (15, 16), one end of each spring is attached to a holder (5) for the traction element (3) and the other end of each spring is attached to a projection (14) of the respective carrier (1), and the projection (14) swivels between two abutments (13, 12) delimiting a recess in the holder (5).

6. The infinitely variable friction gear according to claim 5, wherein a first transmission unit having a first input disc supported coaxially with an input shaft and a first output disc also supported coaxially with the input shaft, the first input and first output shaft being variably rotationally connected by a first friction wheel mounted on a first carrier for the transfer of a torque between the first input disc and the associated first output disc;

a second transmission unit having a second input disc supported coaxially with the input shaft and a second output disc also supported coaxially with the input shaft, the second input and second output shaft being variably rotationally connected by a second friction wheel mounted on a second carrier for the transfer of a torque between the second input disc and the associated second output disc;

a connective element connecting the first carrier in the first transmission unit with the second carrier in the second transmission unit to produce a mutual synchronous swiveling movement between the first and second camera in opposite directions; and wherein the traction element is a contiguous loop arranged in the form of a figure eight defining a crossover point mid-way and having at least a compensating in between the two carriers effectively couple the first and second carriers (1, 2) of the respective transmission units and at least first compensating unit (4) is coupled with the traction element in such a manner that when a differential angle occurs between the first and second swiveling carriers, a spring restoring force is exerted upon the carriers.

7. The infinitely variable friction gear according to claim 6 wherein the compensating elements are integral with the contiguous loop of the traction element.

8. The infinitely variable friction gear according to claim 6 wherein the compensating elements are integral with the first and second swivelling carriers.

* * * * *